(12) United States Patent
Finn

(10) Patent No.: US 6,530,344 B2
(45) Date of Patent: Mar. 11, 2003

(54) NESTING STRUCTURE FOR NORTHERN ROUGH-WINGED SWALLOWS

(76) Inventor: Joseph Finn, 922 Massachusetts Ave. #53, Cambridge, MA (US) 02139

( * ) Notice: Subject to any disclaimer, the term of this patent is extended or adjusted under 35 U.S.C. 154(b) by 0 days.

(21) Appl. No.: 09/852,500

(22) Filed: May 10, 2001

(65) Prior Publication Data

US 2001/0039925 A1 Nov. 15, 2001

Related U.S. Application Data

(60) Provisional application No. 60/203,296, filed on May 11, 2000.

(51) Int. Cl.[7] ............................................. A01K 31/14
(52) U.S. Cl. ........................................................ 119/329
(58) Field of Search ............................... 119/329, 346, 119/437, 441, 428, 431, 433, 435

(56) References Cited

U.S. PATENT DOCUMENTS

| | | | | |
|---|---|---|---|---|
| 3,182,634 A | * | 5/1965 | Myaida | 119/428 |
| 5,325,622 A | * | 7/1994 | Merickel | 119/428 |
| 5,746,156 A | * | 5/1998 | Petrides et al. | 119/428 |
| 6,170,437 B1 | * | 1/2001 | Jones | 119/428 |

FOREIGN PATENT DOCUMENTS

| | | | |
|---|---|---|---|
| DE | 3620449 A1 | * 12/1987 | 119/428 |
| DE | 4114415 A1 | * 11/1992 | 119/428 |

* cited by examiner

*Primary Examiner*—Peter M. Poon
*Assistant Examiner*—Kevin Jakel
(74) *Attorney, Agent, or Firm*—William Nitkin

(57) ABSTRACT

A man-made nesting structure for northern rough-winged swallows for mounting on a wall having a substantially upright surface, such nesting structure being substantially elongated and mounted parallel on the wall surface with an entrance defined at one end and a nesting area defined at the opposite end.

22 Claims, 11 Drawing Sheets

NESTING STRUCTURE FOR NORTHERN ROUGH-WINGED SWALLOWS

This application claims the benefit of Provisional Application No. 60/203,296, filed May 11, 2000.

BACKGROUND OF THE INVENTION

1. Field of the Invention

The present invention relates generally to nesting structures for wild birds and more particularly to an externally wall-mounted, laterally disposed elongated nesting structure acceptable to, selective for and protective of northern rough-winged swallows, which formerly have been known to commonly nest only in cavities within earthen cliffs, banks, excavations and piles, or in cavities within retaining walls, bridge foundations and building walls.

2. Description of the Prior Art

Northern rough-winged swallows once nested only in natural settings, such as in the upright earthen banks of rivers, lakes, oceans, or eroded earthen cliffs. These upright banks or cliffs are inaccessible to some, but not all, predators. In such natural settings these swallows burrow directly into the broad, upright earthen face and deep into the earth behind the exposed face. Though such burrows may be irregular where stones and roots redirect the digging, they are generally substantially horizontal from front to back and generally perpendicular to any substantially planar surface around the burrow entrance.

In such natural settings rough-winged swallows build their grassy, leafy nests at the back ends of such long burrows, a safe distance away from whatever weather and predators might be at, or outside, the bank face.

In natural settings, rough-winged swallows will also nest in burrows previously dug by bank swallows and kingfishers, again placing their nests deep within the earth and away from the exposed upright bank face.

In semi-natural settings, rough-winged swallows nest in burrows dug into upright faces created by earth-moving equipment in road cuttings, excavations and earthen piles and even sawdust piles, here yet again placing their nests deep within the earth or deep within the mass of piled particulate material and well away from the exposed upright face.

Northern rough-winged swallows have commonly nested in artificial settings where exterior upright artificial surfaces such as vertical retaining walls, bridge foundations and building walls simulate the broad, upright natural bank or cliff faces described above, and cavities through and behind these exterior upright surfaces simulate their nesting burrows.

A common artificial nesting setting for northern rough-winged swallows is within small diameter drain pipes set low in concrete retaining walls or bridge foundations along rivers or other bodies of water. Such pipes are substantially perpendicular to the planar exterior surface of the retaining wall but are often inclined slightly to drain water from the earth behind the wall, through the length of pipe and out through the exterior face. Rough-winged swallows, entering through the hole in the retaining wall exterior face, travel through the length of the drain pipe and typically build their nest at the interior end of the pipe, well beyond the plane of the exterior upright wall face.

Nests in the earth or in pipe buried in the earth behind a concrete or other permanent retaining wall are practically inaccessible to humans interested in research or breeding management such as trapping alien birds which usurp nests or controlling parasites which infest such nests.

Nests in retaining wall or bridge foundation drainage pipes are often destroyed in the breeding season when heavy spring rains raise rivers and streams above the level of these low-lying drainage pipes. Even normal rainfall, after draining through the earth behind retaining walls, will dampen nests as water trickles out through such drainage pipes.

Other less common artificial nesting settings are within deep crevices in stone retaining walls and within cavities behind and enterable through small openings in exterior building walls. Nests in these settings, being situated behind the exterior surfaces of such walls, are also inaccessible to humans interested in research or breeding management.

Stone walls so loosely built or buildings so dilapidated as to offer deep cavities to swallows also enable predators, such as rats, to travel within the walls to access the nests.

It is impractical to create nesting sites for rough-winged swallows in existent masonry retaining walls as one would have to drill through such walls and the nests would still be inaccessible to those interested in research or breeding management.

Finally, rough-winged swallows are not known to accept conventional bird houses.

SUMMARY OF THE INVENTION

It is, in general, an object of the present invention to provide an artificial, man-made nesting structure which is mountable on the exterior exposed surface of an artificial wall, is configured to blend in with the surface of the wall to attract the attention of northern rough-winged swallows without attracting avian competitors or human vandals, is adjustably mountable to protect a nesting from flood waters or avian competitors, is passively protective of the nesting, permits convenient internal access for non-disruptive, protective, active human management and research of the occupied enclosed nest, and is economical to create and maintain for annual reuse, as specified in the further objects stated below.

It is a further object of the present invention to provide a nesting cavity highly acceptable to northern rough-winged swallows, a species not known to commonly accept bird houses.

It is a still further object of the present invention to provide a self-contained nesting structure which may be externally mounted on the exposed face of a retaining wall or bridge foundation.

It is a still further object of the present invention that this externally wall-mounted structure contain a nesting chamber for northern rough-winged swallows, a species previously known to commonly nest only behind the exposed planar face or exposed broad surface of formations such as retaining walls or upright earthen banks.

It is yet a further object of the present invention to provide an elongated and substantially horizontal nesting cavity parallel to, and outside of, the wall face rather than perpendicular to, and behind, the wall face, yet still satisfying the instinct of these swallows to build nests distant from the cavity entrance.

It is yet a further object of the present invention to provide a rough-winged swallow nesting structure accessibly locatable external to the face of a retaining wall or bridge foundation, and thus permitting convenient, non-disruptive access to the nesting cavity through an easily removable and replaceable nest access door, to allow research and active human management of the nesting cavity such as trapping of destructive competitors or removal of parasites and old nests.

It is a still further object of the present invention that this externally wall-mounted structure will appear to blend in with the wall on which it is mounted, so that it might be misperceived by rough-winged swallows to be part of that wall, and so that the nesting cavity formed within the present invention might be misperceived by such swallows to be formed within the wall on which the structure is mounted.

It is yet a further object of the present invention that the shape of the nesting structure also might cause vandals to ignore the nesting structure when misperceiving it as part of the wall on which it is mounted.

It is a further object of the present invention that the shape of the nesting structure will discourage predators from resting upon it or entering it.

It is a further object of the present invention that the entrance in relation to the shape of the nesting structure will be noticeable and accessible to low-flying swallows, and less noticeable and less accessible to high-flying birds of other competing species.

It is a still further object of the present invention to provide a wall-mounted rough-winged swallow nesting structure which, unlike fixed retaining wall drainage pipes, may be ideally mounted above river flood waters yet close to such waters to favor swallows over other species which fly higher when over water.

It is a yet further object of the present invention to provide a manually height adjustable mounting mechanism, permitting convenient raising or lowering of the nesting structure relative to rising or falling river water levels, or to facilitate human access.

It is also a further object of the present invention to provide an automatically adjustable height mounting mechanism by which raising or lowering the nesting structure is accomplished by a flotation device in the rising or falling water.

It is a further object of the present invention to provide ventilation within the nesting structure without admitting excess light, which might repel swallows used to nesting in dark, dead-end tunnels, and to provide a sun shield to shade the structure from the sun.

It is a still further object of the present invention to provide various embodiments to suit the inclined walls of bridge arches, etc.

Lastly, it is a still further object of the present invention to provide an artificial structure which is economical to fabricate from materials light in weight and easy to work with, such as wood, plastic or metal.

The present invention fulfills the foregoing objects in specific ways to be described further below of the general form and function of the preferred embodiment: a planar structural back board member, such as a board, which is longer than it is wide, and which is relatively thin, with parallel edges and ends, is oriented so that its length is substantially horizontal, its width is substantially vertical, and the plane of the back board member surface is substantially parallel to the plane or broad upright surface of the wall or bridge foundation on which it will be mounted.

Attached upon and parallel to the long upper edge of this back board member is the long back edge of a roof member. This planar roof member, such as a board, is approximately the same length as the back board member, is longer than it is wide, is relatively thin, with parallel edges and ends, is oriented so that its length is substantially horizontal, its width sloping downward and forward from its line of attachment to the back board, ideally at about a 45-degree angle to the back board member.

The long, lower front edge of this sloping roof member is attached upon, and parallel to, the long upper front edge of a front wall member. This planar front wall member, such as a board, is approximately the same length as the back board and roof members, is longer than it is wide, is relatively thin, with parallel edges and ends, is oriented so that its length is substantially horizontal, its width sloping downward and backward from its line of attachment to the roof member, ideally at about a 90-degree angle to the roof member.

The long lower back edge of this sloping front wall member is attached beneath, and parallel to, the long lower edge of the back board member, ideally at about a 45-degree angle to the back board member.

The back board, roof, and front wall together form a substantially horizontal, elongated hollow structure which is triangular in cross-section or end view.

The nesting cavity formed by the substantially horizontal, elongated structure is at least 1¾ as long as it is high or wide, and preferably 4 to 6 times as long as it is high and is so configured to meet a basic instinct of rough-winged swallows: to nest within substantially horizontal elongated cavities.

The triangular configuration, with the back board closely parallel to the retaining wall on which it is to be mounted, with the roof at an obtuse angle to the retaining wall above, and with the front wall at an obtuse angle to the retaining wall below, unobtrusively forms a three-dimensional volume on the two-dimensional surface of the retaining wall, thereby being likely to be seen as part of that retaining wall by rough-winged swallows which previously commonly nest only behind the face of such walls.

By providing a substantially horizontal elongated nesting cavity which runs along a retaining wall, external to the exterior surface of such a wall, which may be misperceived as part of such a wall by rough-winged swallows, an important overall object of the present invention is attained: to provide a nesting structure highly acceptable to rough-winged swallows which is not dependent on such a retaining wall to provide the nesting cavity, but is only dependent on the retaining wall to provide a broad, upright surface by which to initially attract rough-winged swallows, and on which to mount the present invention.

By attaining this important object of the present invention, many of the other objects listed below are made possible.

Continuing with an embodiment of the present invention, a floor member within the elongated hollow structure is attached between the lower inner surface of the back board and the inner surface of the front wall to create a substantially level floor above the acutely angled intersection of the upright back board and the sloping front wall.

A similar ceiling member within the elongated hollow structure is attached between the upper inner surface of the back board and the inner surface of the roof to create a substantially level ceiling below the acutely angled intersection of the upright back board and the sloping roof.

The narrow planar floor and ceiling members, which can be wood strips, are nearly the same length as the back board, roof, and front wall, are longer than they are wide, with parallel long edges and ends, these long edges angled to suit attachment to the upright back board and the sloping front wall or sloping roof as may apply.

The nesting cavity within the elongated, substantially horizontal nesting structure is below the ceiling and above the floor.

This nesting cavity is enclosed with a five-sided panel located at the opposite ends of the elongated structure, creating a dark interior enterable by rough-winged swallows only through an entrance to be described below. This dark interior is attractive to these birds which typically nest in long, dark, dead-end burrows or pipes set in earth or concrete.

The empty spaces below the floor and above the ceiling partially isolate the nesting cavity from the radiant heat of the sun reflected off of water below or radiated directly from the sun above, reducing heat buildup to accommodate these birds which typically nest in the cool earth or cool concrete.

The empty spaces below the floor and above the ceiling are left open at the opposite ends of the elongated structure, permitting ventilation of these spaces to the outside.

To provide more cooling of the nesting cavity, air passages are formed in the center portion of the elongated ceiling. Fresh cool air may enter through the swallow entrance near one end of the elongated nesting cavity to replace the internal air warmed by solar radiation on the front wall and roof, rising through passages in the center portion of the ceiling, passing through the empty space above the ceiling, and exiting through the upper end openings.

The air flow up through the center portion of the ceiling bypasses the nest built at the end opposite the entrance, thereby cooling the interior without creating a direct harmful draft on the nest itself.

Any light which enters the nesting cavity through the upper ventilating features of the present invention would be negligible, indirect, diffuse, and not emanating from the end opposite the bird entrance. This dead-end darkness achieves the object of simulating the protective, nearly complete enclosure which rough-winged swallows have around their nests at the inner end of natural burrows or drainage pipes.

An optional thin planar sheet, such as sheet metal or sheet of opaque plastic, corresponding to the shape of the roof, and removably positioned parallel to the plane of the roof, but with a space between it and the roof, maintains the overall configuration of the nesting structure, while shielding the roof from direct sunlight in very sunny locations. This optional sun shield helps to maintain a cooler nesting cavity for these birds which are accustomed to nesting in the cool earth.

The steeply sloped roof or parallel sun shield is difficult for predators such as sea gulls, ravens or rats to rest upon.

The undercut and steeply sloped front wall is resistant to such predators as well.

The overall configuration of the present invention, which is intended to unobtrusively blend with the retaining wall, is not likely to attract the attention of vandals when such nesting structures are mounted in public places along rivers, lakes, and harbors.

The location of the entrance to the nesting structure in relation to the exterior shape of the structure is an important factor in fulfilling an important object which is to provide a nesting structure which discriminates in favor of northern rough-winged swallows over alien nesting competitors such as English sparrows and European starlings. The bird entrance to the structure is an opening formed in the upper portion of the undercut sloping front wall, near one end of the nesting structure. This entrance, being on the underside of the nesting structure is more visible to low-flying rough-winged swallows, which are very comfortable skimming over the surface of water, but less visible to higher-flying sparrows and starlings which would otherwise usurp the nesting site. The entrance in the undercut, sloping front wall is also more easily approached in flight by agile swallows than by less agile sparrows and starlings. An adjustable angle tail brace can be included to ease entry for rough-winged swallows when alien competition is of less concern than ease of entry for swallows themselves. Also, the present invention is equipped to permit more convenient trapping of such aliens.

The present invention, unlike fixed preexistent drain pipes, etc., may be ideally mounted on a retaining wall, etc., close to the water level to favor rough-winged swallows over sparrows and starlings.

The present invention, again unlike fixed preexistent drain pipes, etc., may be ideally mounted on a retaining wall, etc., above the historical or usual high-water mark to protect rough-winged swallows from tides and flood waters.

An embodiment of the present invention further fulfills the objects by discriminating in favor of low-flying rough-winged swallows while protecting them from rising flood waters by including a sliding adjustable mounting device which conveniently permits the human manager to manually raise or lower the nesting structure to maintain a mounting height close to, but safely above, such rising or falling water levels.

In another embodiment, a flotation device can be provided in rising or falling water below the nesting structure to control the raising or lowering of the nesting structure thereabove.

Various embodiments of the present invention may include modifications to adapt the nesting structure to certain settings such as the inclined surfaces of bridge arches, or the partially enclosed walls within concrete culverts.

The present invention fulfills an object by being economically made of light, easy to work with materials, such as wood, metal, or plastic, rather than the bulky, heavy masonry or earth which rough-winged swallows typically make their nests in.

As a self-contained nesting unit, the present invention may be located in many places where existent retaining walls and bridge foundations offer no existent nesting cavities at all, and thus the present invention may create a presence of rough-winged swallows where they were previously absent.

A very important object of the present invention is fulfilled by providing a rough-winged swallow nesting structure which is accessibly mounted outside the exposed surface of a retaining wall or bridge foundation, etc. A nesting area access opening for access by researchers and wildlife managers is formed in the roof at the end of the nesting structure opposite the end at which the bird entrance is formed. A nesting area access door is removeably and replaceably fitted into this nest access opening, or over this opening, to enclose the nesting chamber. The nest access opening and door permit human access for research, photography, and active beneficial management such as removal of parasites or trapping of alien birds.

DESCRIPTION OF THE PREFERRED EMBODIMENT(S)

Figure 1:
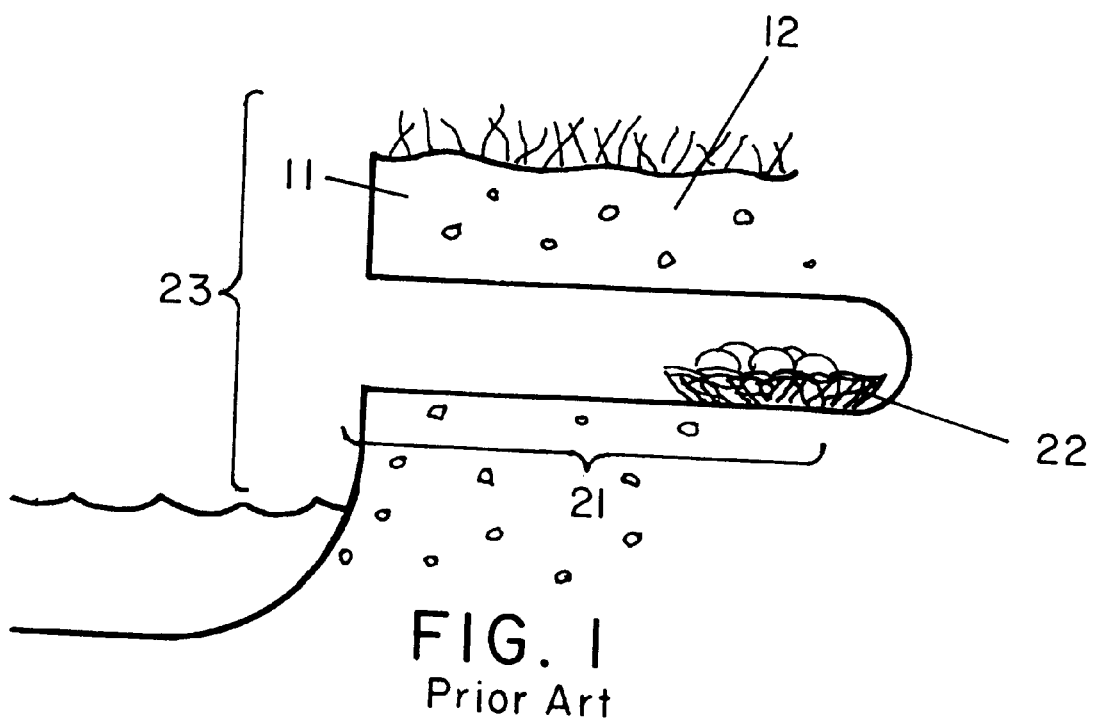
FIG. 1 illustrates a cross-sectional view of a prior art natural nesting burrow in a cliff or earthen bank for rough-winged swallows.
Figure 2:
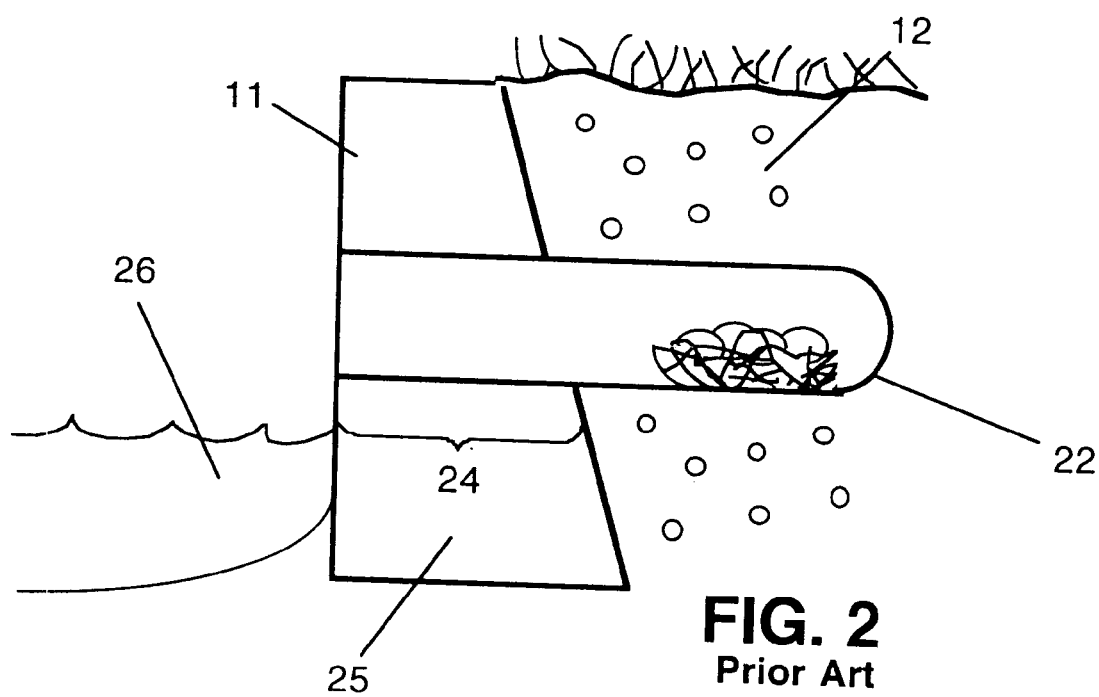
FIG. 2 illustrates a cross-sectional view of a retaining wall with drainage pipe offering a potential prior art nesting site for rough-winged swallows.
Figure 3:
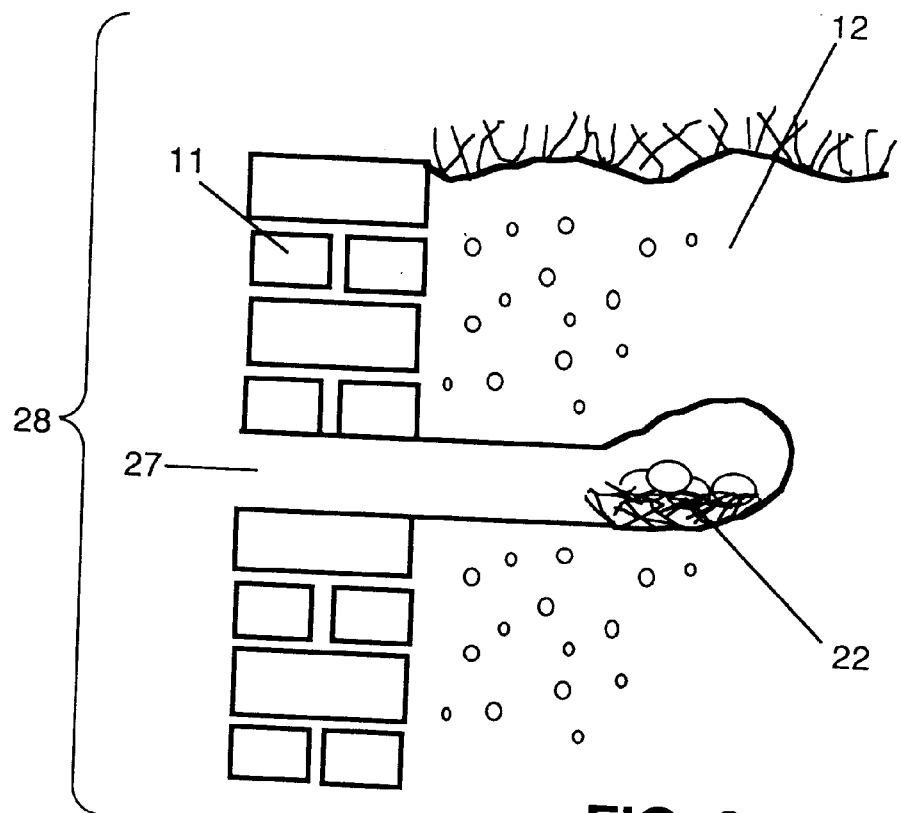
FIG. 3 illustrates a cross-sectional view of a stone wall with a gap between stones offering a potential prior art nesting site for rough-winged swallows.

A brief explanation of the prior art in reference to the drawings will provide an understanding of the objects of the invention and the limitations of prior art, as illustrated in FIGS. 1–3.

Referring to the drawings, FIG. 1 illustrates a cross-sectional view of natural nesting burrow 21 having nest lining 22 built by rough-winged swallows positioned inaccessibly deep within, and perpendicular to, broad upright exterior face 11 of natural earthen bank 23.

FIG. 2 illustrates a cross-sectional view of drainage pipe 24 situated low in retaining wall 25 with nest lining 22 built by swallows inaccessibly deep within, and perpendicular to, upright exterior face 11 of retaining wall 25, and subject to flooding when water 26 rises.

FIG. 3 illustrates a cross-sectional view of crevice 27 accidentally situated in stone wall 28, with nest lining 22 again built perpendicular to the stone wall and inaccessibly deep behind the upright exterior face 11 of stone wall 28, and vulnerable to rats moving through such loosely built stone wall 28.

In FIGS. 1–3, a substantial mass of earth 12 is behind upright exterior face 11, as is typical in northern rough-winged swallow nesting situations.

Prior art nesting situations shown in FIGS. 1–3 are subject to some or all of the problems or limitations already detailed in the Description of the Prior Art, including, erosion, flooding, predation, and inaccessibility for research purposes and breeding management.

Figure 4:
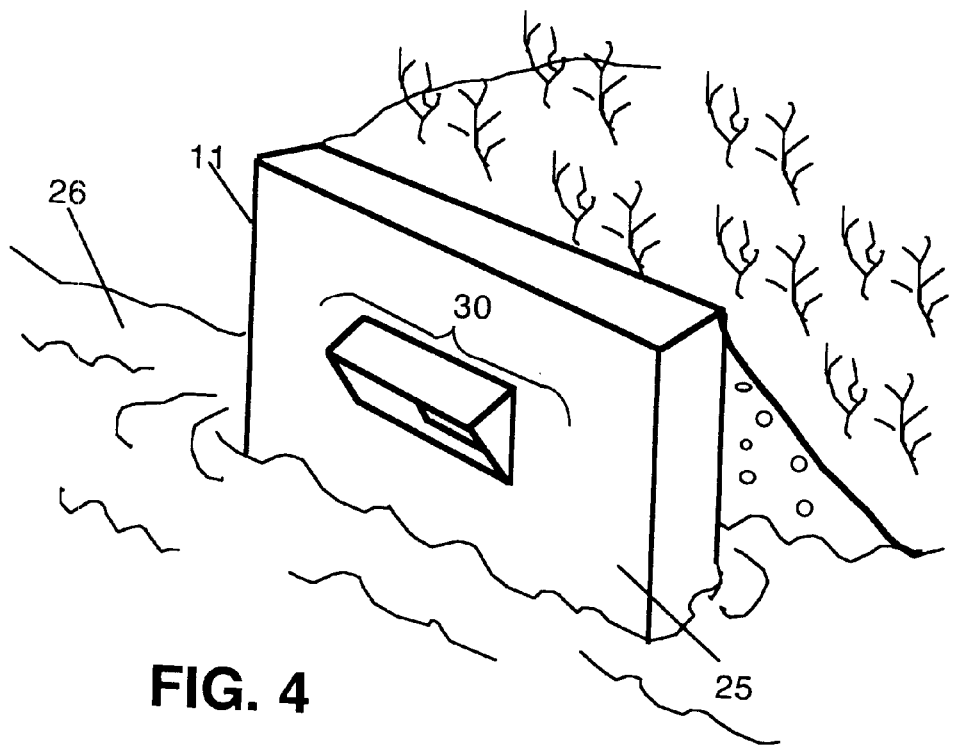
FIG. 4 illustrates a perspective view of the preferred embodiment of this invention mounted on the exposed surface of a retaining wall.

FIG. 4 shows nesting structure 30 oriented substantially horizontally on broad upright exterior face 11 of retaining wall 25. The nesting structure 30 should ideally be level along its length, but would still attract rough-winged swallows even if as much as 30 degrees out of level. The broad upright exterior face 11 attracts rough-winged swallows and supports the nesting structure 30 at a chosen biologically ideal height above water 26.

Figure 5:
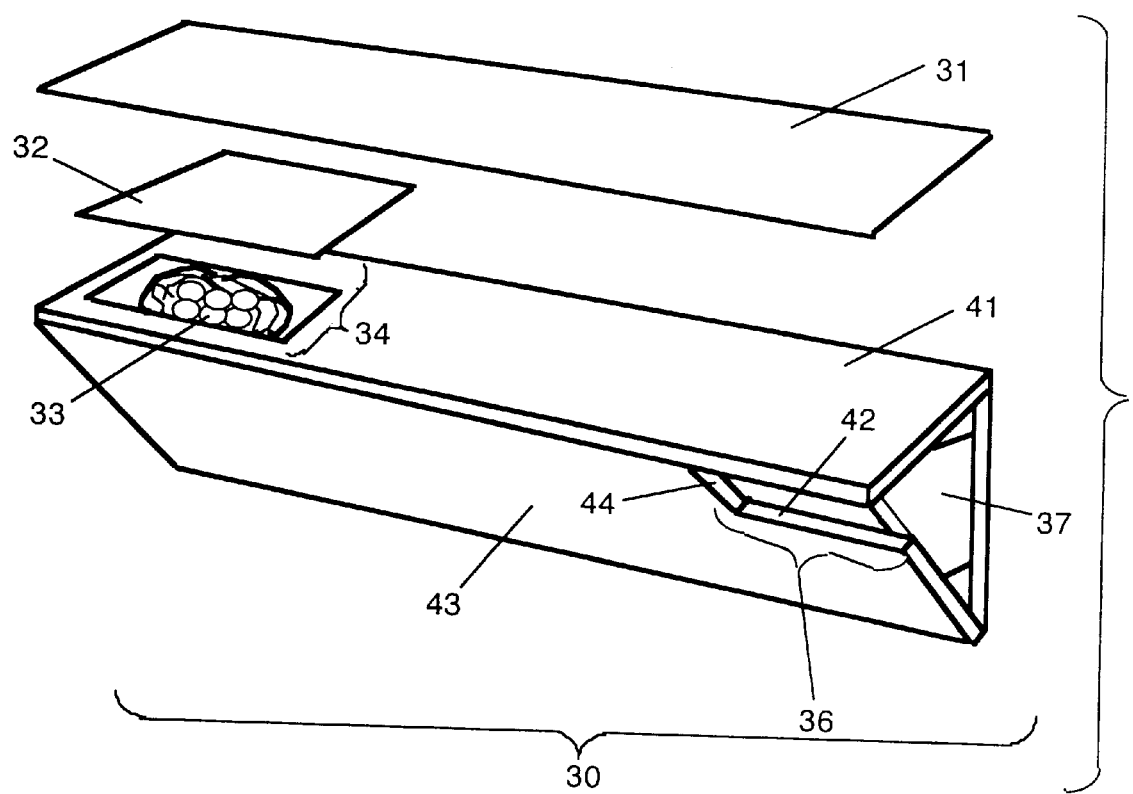
FIG. 5 illustrates a perspective view of the preferred embodiment of this invention showing the nest access door separated from the structure and the optional sun shield positioned above the structure.

FIG. 5 shows the preferred embodiment of nesting structure 30 with an optional sun shield 31 and nest access door 32 raised thereabove to show nest 33 within nesting structure 30, accessible through nest access opening 34 formed in roof 41 at the opposite end from where bird entrance 36 is formed in front wall 43. End panels, such as end panel 37, close the ends of the nesting cavity within nesting structure 30.

Figure 6:
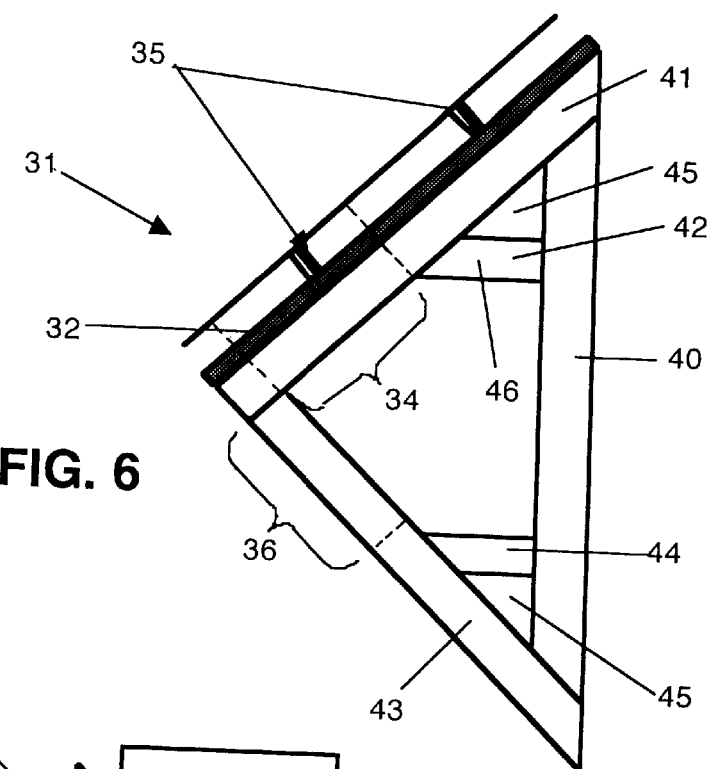
FIG. 6 illustrates a cross-sectional view of the preferred embodiment of this invention showing the relationship between the structural members and the bird entrance, the nest access door, ventilating openings, and optional sun shield.

FIG. 6 shows in cross-section upright back board 40 attached along its upper edge to upper edge of roof 41. Roof 41 slopes substantially forward, ideally at 45 degrees to back board 40, however any angle between 30 degrees and 60 degrees would be likely to still attract and protect rough-winged swallows while still achieving reasonable economy regarding use of construction materials. Roof 41 is attached along its lower edge to the upper edge of front wall 43. Front wall 43 slopes substantially backward, ideally at 45 degrees, however any angle between 30 degrees and 60 degrees, with consideration for the angle chosen for roof 41, would be likely to still attract and protect rough-winged swallows while still achieving reasonable economy of construction material. Front wall 43 is attached along its lower edge to the lower edge of back board 40. Ceiling 42 is situated between back board 40 and front wall 43. Floor 44 is situated between back board 40 and front wall 43. The length of the nesting cavity 92 created between back board 40, roof 41, front wall 43, ceiling 42 and floor 44, as measured from inside edge 94 of bird entrance 36 to the end panel at the bird nesting area 94, should ideally be about 4 to 6 times as long as it is high or wide, however rough-winged swallows might occasionally or eventually through their experience with this invention come to accept a cavity length as little as 1¾ times as long as it is high or wide. Bird entrance 36 is formed in the upper portion of front wall 43 near one end of nesting structure 30, with nest access opening 34 formed at the opposite end in the lower portion of roof 41. In a preferred embodiment the nesting cavity can have a horizontal length of at least 12¼ inches; a width, as measured from the inner surface of back board 40 to the most forward inner surface of front wall 43, in the range of 3½ inches–7 inches; and a height, as measured from the inner surface of floor 44 to the inner surface of ceiling 42, of approximately 3 inches–7 inches; such nesting cavity 92 having a total interior horizontal length of at least 1.75 times the interior height of nesting cavity 92 and/or at least 1.75 times the maximum width of nesting cavity 92.

Upper ventilation passages 45 and lower ventilation passages 45a are formed above ceiling 42 and beneath floor 44, and run the length of the nesting structure, and are open at the ends. A plurality of ventilation openings 46 are formed in ceiling 42 along the center portion of its length. Nest access door 32 rests upon roof 41. Sun shield 31 is parallel to, but spaced slightly away from, roof 41 by shield spacers 35.

Figure 7:
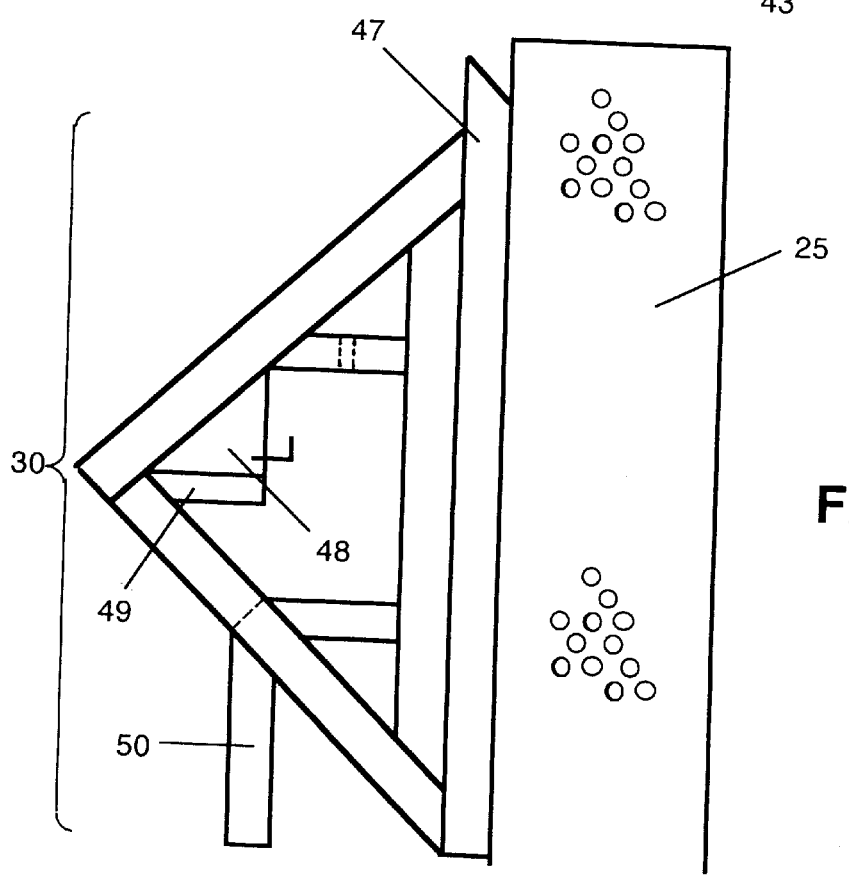
FIG. 7 illustrates a cross-sectional view of the preferred embodiment of this invention, showing the trap attachment features such as an optional entrance restrictor block, an optional bird entrance perching block, and optional back board mounting blocks.

FIG. 7 shows mounting block 47 holding nesting structure 30 slightly away from retaining wall 25. Trap attachment block 48, restrictor block 49, and optional perching block 50 are shown.

Figure 8:
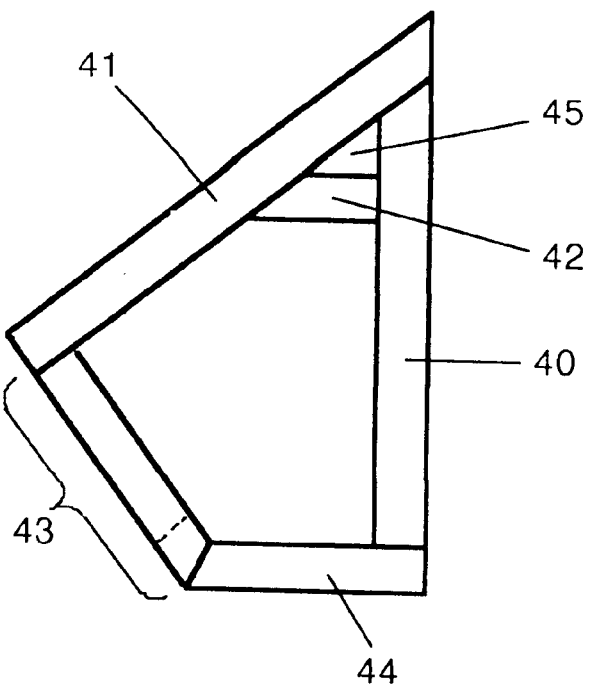
FIG. 8 illustrates a cross-sectional view of an alternate embodiment of this invention eliminating the portion of the preferred embodiment beneath the floor.

FIG. 8 shows a cross-section of an embodiment with only one upper ventilation passage 45.

Figure 9:
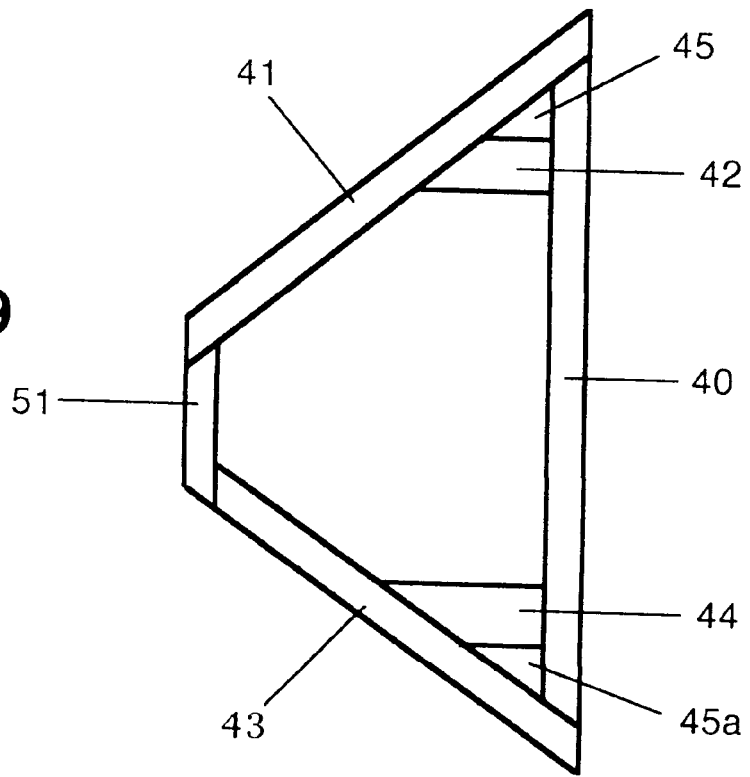
FIG. 9 illustrates a cross-sectional view of an alternate embodiment of this invention including an additional member inserted between the front edges of the roof and sloping front wall.

FIG. 9 shows a cross-section of an alternate embodiment with an additional upright member 51 running the length of the front of a nesting structure.

Figure 10:
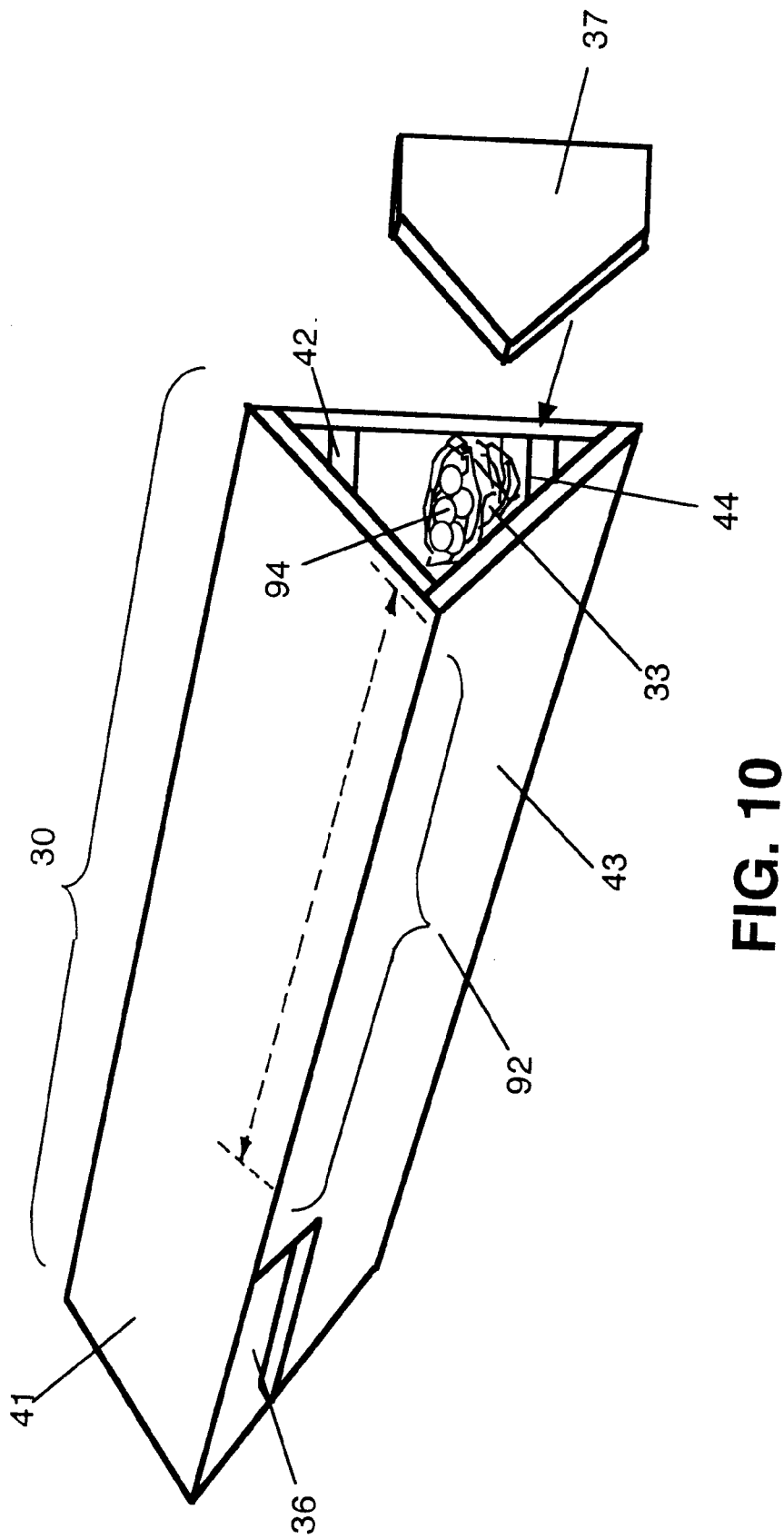
FIG. 10 illustrates a perspective view of an alternate embodiment with removable end panel.

FIG. 10 shows an embodiment with end panel 37 made removable for access to the interior. Removable end panel 37 fits between back wall 40, roof 41, front wall 43, and overlaps ends of floor 44 and ceiling 42 at the end of nesting area 94.

Figure 11:
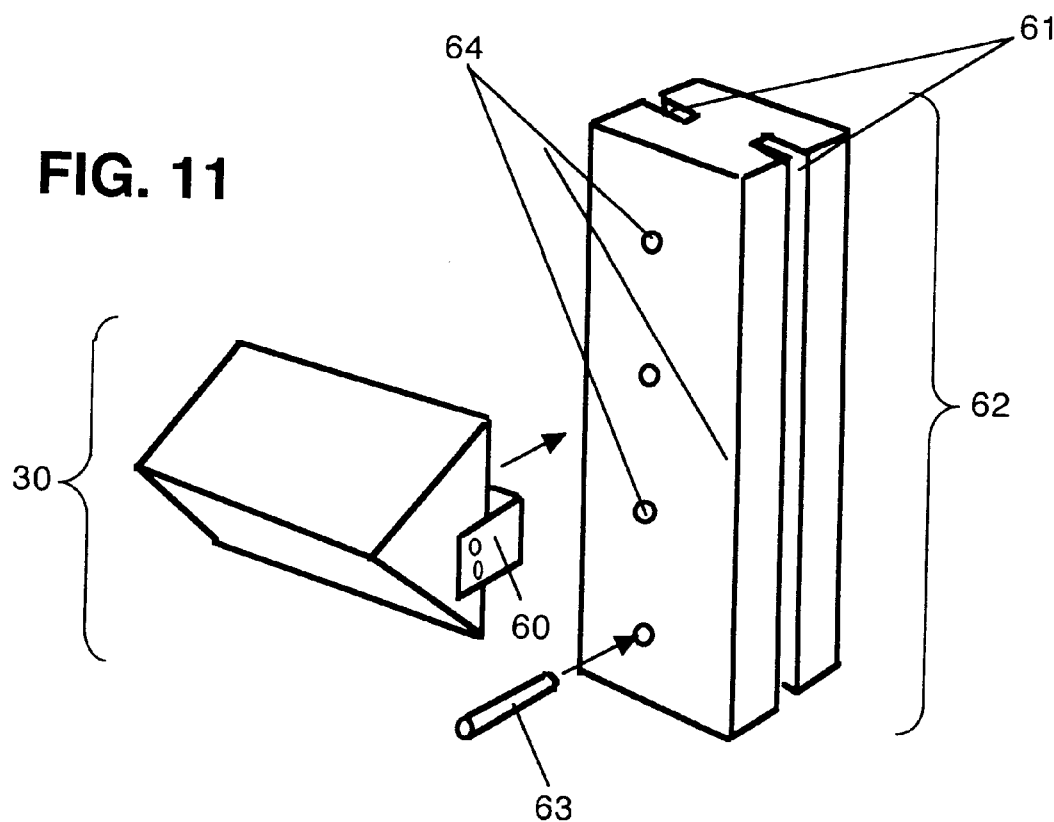
FIG. 11 illustrates a perspective view of an alternate embodiment which includes a manually operable, sliding-action, wall-mounted height adjustment device.

FIG. 11 shows a nesting structure with one or two sliding brackets 60 able to slideably engage grooves 61 formed in adjustable mounting board 62, and fastener peg 63 insertable into holes 64 to secure adjustment, being just one of many ways to slideably engage nesting structure 30 on adjustable mounting board 62.

Figure 12:
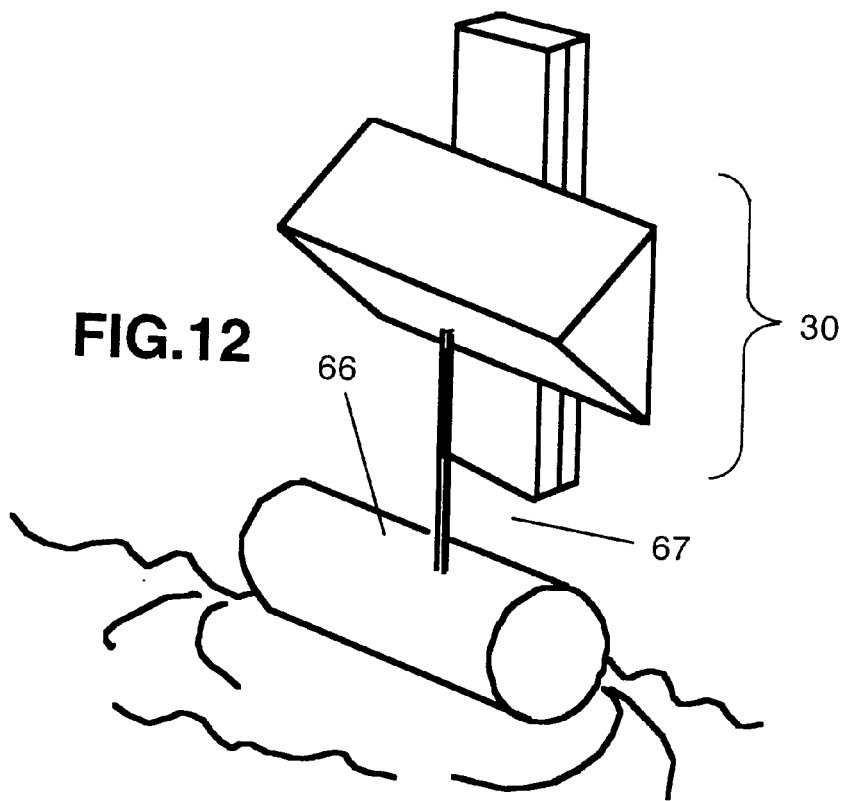
FIG. 12 illustrates a perspective view of a flotation-activated height adjustment device.

FIG. 12 shows a flotation activated height adjustment device with float 66 in water 26 regulating the height of nesting structure 30 by connecting rod 67.

Figure 13:
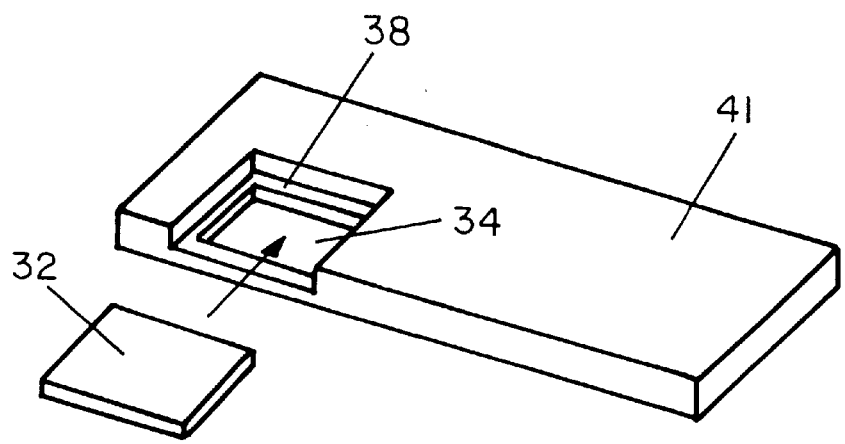
FIG. 13 illustrates a perspective view of a rabbeted recess around three of four sides of the nest access opening, with correspondingly thin access door to fit flush in the recess.

FIG. 13 shows a rabbeted recess 38 around three of four sides of nest access opening 34, and a correspondingly thin nest access door 32 capable of fitting flush into recess 38.

Figure 14:
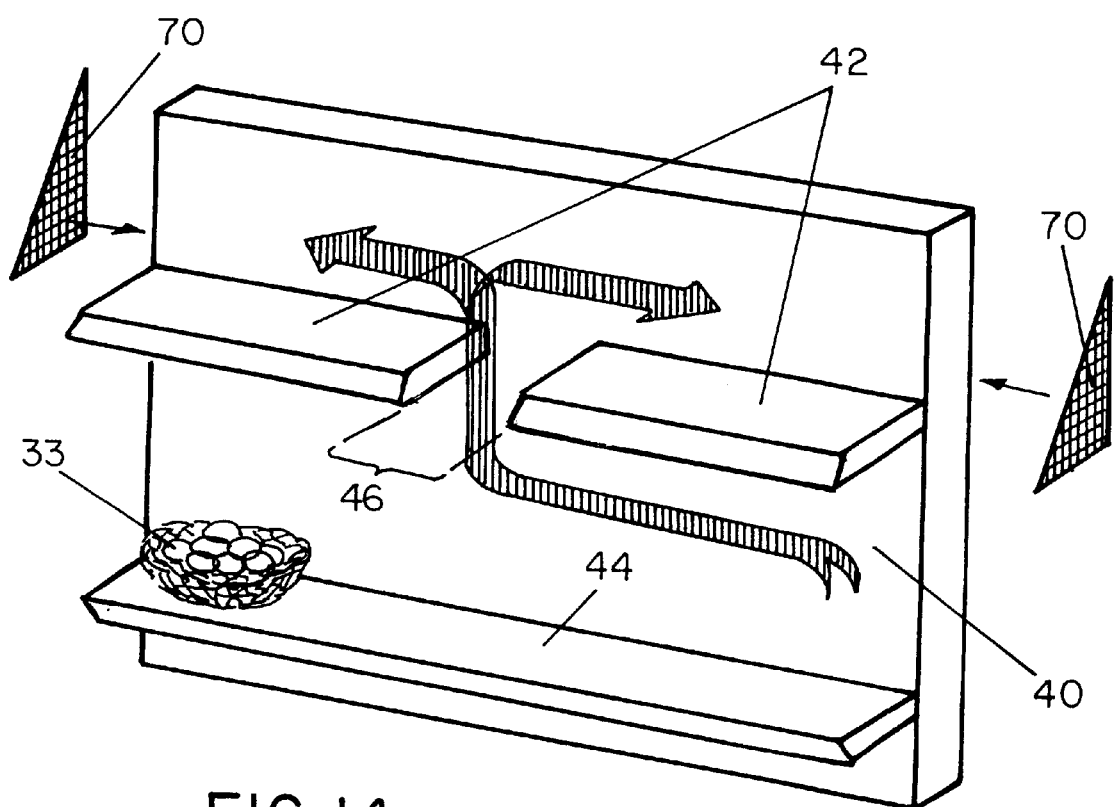
FIG. 14 illustrates a perspective cutaway view showing the back wall, split ceiling, floor and nest with arrows indicating the direction of ventilating air flow through a gap in the ceiling and the positioning of triangular screens to block insect entry, such screens shown separated from the structure.

FIG. 14 shows an alternate split ceiling 42, the gap between the two ceiling parts forming an alternate ventilating opening 46.

Insect screens corresponding in size and shape to the ends of the upper ventilation passage are also shown. These screens would block insects which might otherwise fill the ventilation passage with webs, etc.

Figure 15:
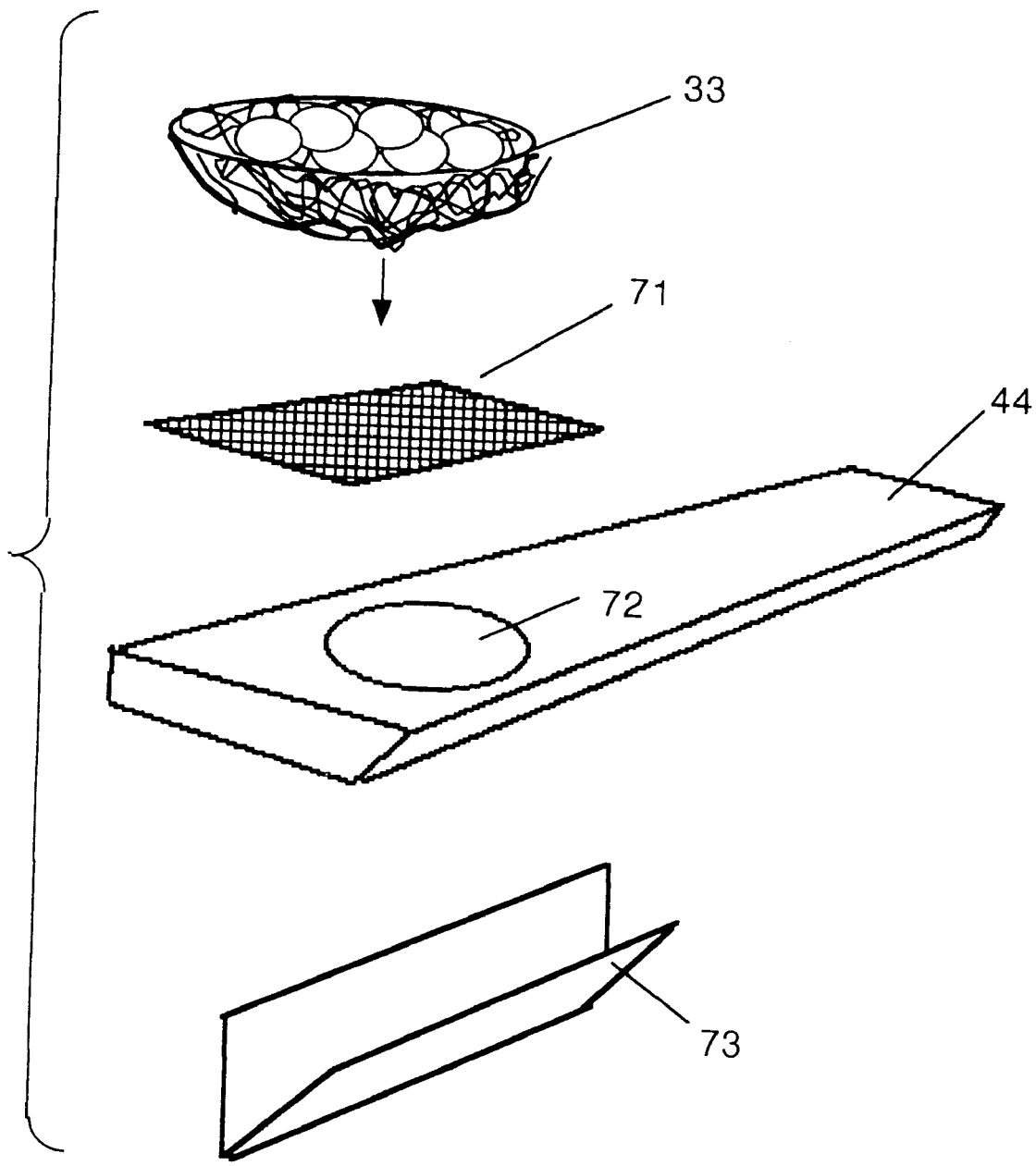
FIG. 15 illustrates a perspective view of vertically separated arrangement of a bird nest, nest support screen, and floor with nest parasite clean-out hole disposed over a nest debris collector formed to fit in a lower ventilation passage.

FIG. 15 shows how parasites or debris from nest 33 is allowed to sift through nest support screen 71, fall through nest parasite clean-out hole 72 in the floor to be collected in nest debris collector 73 which is positioned within lower ventilation passage 45a.

Figure 16:
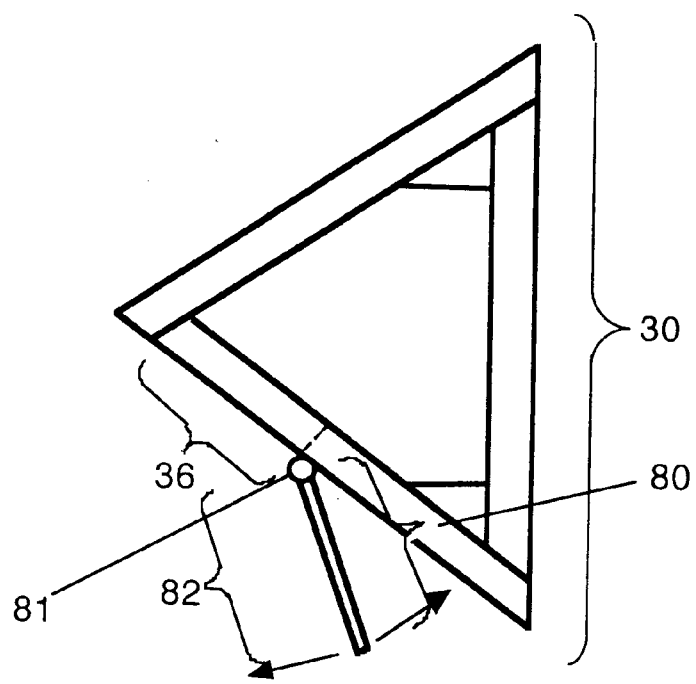
FIG. 16 illustrates a cross-sectional view of an embodiment showing an adjustable angle landing mechanism.

FIG. 16 illustrates a substantially planar adjustable angle landing mechanism 80, pivoting on pivot 81 below bird entrance 36 allowing adjustment to permit greater or lesser comfort for desirable or undesirable birds bracing their tails upon landing on tail brace surface 82.

Figure 17:
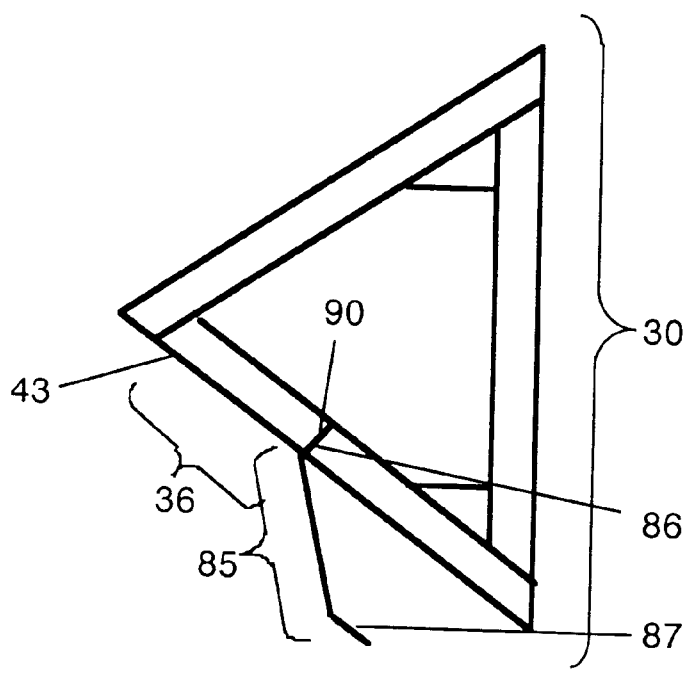
FIG. 17 illustrates a cross-sectional view of an embodiment showing a sheet material forming a reversible angle landing bracket adjustable in one of two possible positions.

FIG. 17 illustrates a formed sheet material having a sharp bend 86 and an obtuse bend 87, offering a reversible choice of angle for attachment of reversible landing bracket 85, depending on which end of the sheet material is attached to bottom 90 of bird entrance 36 in order to offer choice of comfort level for desirable or undesirable birds, in approaching entry to the structure.

While the nesting structure of this invention may be embodied in many different forms, a preferred embodiment is illustrated and will be described in specific form with the understanding that the disclosure is to be considered as one embodiment of the principles of the invention and is not intended to limit the invention to the specific embodiment illustrated and described.

I claim:

1. A man-made nesting structure for rough-winged swallows for mounting on a wall having a substantially upright outer surface, comprising:
   a substantially elongated structure having a hollow interior, said structure mounted externally on the outer surface of said wall, elongated said structure having a long axis extending horizontally and closely parallel to the outer surface of said wall, elongated said structure having a first and second end;
   an entrance defined at said first end;
   a nesting area defined at said second end; and
   a downwardly slanting roof member having a front, said roof member to aid in preventing predators from gaining access to said hollow interior of said nesting structure and an upwardly slanting wall of said structure elongated, where on outer surface of said upwardly slanting wall is directed at a downward angle from a horizontal plane, said entrance defined, in said upwardly slanting wall where rough-winged swallows fly upwardly into said entrance.

2. The nesting structure of claim 1 wherein said upwardly slanting wall is a front wall member angularly disposed below and extending rearwardly from said downwardly slanting roof member, said front wall member having said entrance defined therein.

3. The nesting structure of claim 2 further including:
   a ceiling member disposed therein extending rearward from said roof member toward said wall forming an air channel between said ceiling and said roof member.

4. The nesting structure of claim 3 further including a floor member extending rearward from said front wall toward said wall.

5. The nesting structure of claim 4 further including a back wall member having a top and a bottom, said roof member extending downwardly from said back wall member, and said front wall member extending rearwardly and downwardly from the front of said roof member to the bottom of said back wall member, wherein a nesting cavity is defined within said hollow interior, said nesting cavity having a length as measured from said entrance to said second end and a height wherein said length is approximately 1¾–6 times said height.

6. The nesting structure of claim 5 wherein said floor member extends between said front wall member and said back wall member forming an air channel below said floor member and between said front wall member and said back wall member.

7. The nesting structure of claim 6 further including first and second end panels disposed, respectively, at said first and second ends of said structure, said first and second end panels covering said openings defined by said back wall member, said roof member and said front wall member, said first and second end panels designed to leave open said air channels above by said ceiling member and below said floor member.

8. The nesting structure of claim 7 further including an access aperture defined in said elongated structure and a removable access door disposed over said access aperture, said removable access door, when removed, allowing human access to said nesting area.

9. The nesting structure of claim 8 further including a sun shield disposed above said roof member.

10. A nesting structure for rough-winged swallows, said structure for positioning on a substantially upright surface, comprising:

a planar vertically disposed, laterally extending, elongated back wall member, said back wall member having an inner surface, a top, a bottom, first and second ends, said back wall disposed on said upright surface, said back wall member having an upper portion and a lower portion;

a planar elongated roof member having a length extending laterally substantially the same distance as the length of said back wall, said roof member having a front and rear, said rear of said roof member affixed to said top of said back wall, said roof member extending from said back wall at a downward slope from 30 degrees–60 degrees;

a planar elongated front wall member having an inner surface and a length extending laterally substantially the same distance as the length of said back wall, said front wall having a front and rear, said rear of said front wall attached to said bottom of said back wall, said front wall member extending from said back wall at an upward slope from 30 degrees–60 degrees, said front wall having an upper portion and a lower portion affixed to said front of said roof member forming a partially enclosed structure having first and second ends with said roof member and said back wall, said partially enclosed structure having an upper portion and a lower portion;

a planar elongated horizontally disposed floor member having an inner surface and a length extending laterally substantially the same distance as the length of said back wall, said floor member being disposed within said lower portion of said partially enclosed structure between said front wall and said back wall, said floor member together with said lower portions of said front wall and said back wall defining an elongated lower ventilation passage below said floor member and open at the first and second ends of said structure;

a planar elongated, horizontally disposed ceiling member having an inner surface and a length extending laterally substantially the same distance as the length of said back wall, said ceiling member being disposed within the upper portion of said partially enclosed structure affixed to said roof member and said back wall, said ceiling member, together with said roof member and said back wall defining an elongated upper ventilator passage above said ceiling member and open at the first and second ends of said structure;

first and second planar end panels disposed vertically respectively at said first and second ends of said structure and perpendicularly affixed along the first and second ends of said floor member and said ceiling member, and along those portions of said first and second ends of said back wall, said roof member and said front wall which are above said floor member and below said ceiling member, thus enclosing said first and second ends of said structure between said floor and said ceiling, but leaving open said upper and lower ventilation passages;

a bird entrance having an inside edge and a lower edge defined in the upper portion of said front wall member at said first end; and an elongated, substantially horizontal nesting cavity defined within said structure from said inside edge of said bird entrance to said second end within said structure, said nesting cavity having a horizontal length of at least 12¼ inches at said second end of said structure and having a width as measured from said inner surface of said back wall to said most forward inner surface of said front wall in the range of 3½ inches to 7 inches, and having a height as measured from said inner surface of said floor member to said inner surface of said ceiling member of approximately 3 inches to 7 inches, said horizontal nesting cavity having a total interior horizontal length of at least 1.75 times the interior height of said nesting cavity or at least 1.75 times the maximum width of said nesting cavity.

11. The nesting structure of claim 10 further including:

a nest access opening defined at said second end of said structure; and a removable nest access door positioned over said nest access opening.

12. The nesting structure of claim 11 wherein said nest access opening is formed in said roof member.

13. The nesting structure of claim 11 wherein said nest access opening is formed by the removal of an end panel at said second end of said structure.

14. The nesting structure of claim 10 further including a thin planar rectangular sun shield corresponding approximately in size and shape to the size and shape of said roof member and positioned slightly above said roof member in a plane parallel to the plane of said roof to shield said roof member from sun and rain.

15. The nesting structure of claim 10 further including at least one opening defined in said ceiling member to provide at least one ventilation opening between said nesting area below said ceiling member and said upper ventilation passage.

16. The nesting structure of claim 10 further including window screens positioned over said upper and lower ventilation openings at said first and second ends.

17. The nesting structure of claim 10 further including at least one opening defined in said floor member near said second end, said opening permitting nest parasites and debris to fall from said nesting space down into said lower ventilation passage therebelow.

18. The nesting structure of claim 17 further including a removable piece of material disposed in said lower ventilation passage for collecting said nest parasites and debris.

19. The nesting structure of claim 10 further including means to raise and lower said structure.

20. The nesting structure of claim 10 further including means to restrict access to said nesting structure only to said rough-winged swallows.

21. The nesting structure of claim 10 further including a tail brace disposed at an angle below said entrance.

22. The nesting structure of claim 10 wherein the angle at which said tail brace is disposed is adjustable.

* * * * *